(12) United States Patent
Hartmann et al.

(10) Patent No.: US 7,325,811 B2
(45) Date of Patent: Feb. 5, 2008

(54) CHUCK

(75) Inventors: Markus Hartmann, Mauerstetten (DE); Martin Noser, Schaan (LI); Guenther Sanchen, Grabs (CH)

(73) Assignee: Hilti Aktiengesellschaft, Schaan (LI)

( * ) Notice: Subject to any disclaimer, the term of this patent is extended or adjusted under 35 U.S.C. 154(b) by 132 days.

(21) Appl. No.: 11/173,625

(22) Filed: Jun. 30, 2005

(65) Prior Publication Data

US 2006/0017239 A1   Jan. 26, 2006

(30) Foreign Application Priority Data

Jul. 23, 2004   (DE)   ...................... 10 2004 035 873

(51) Int. Cl.
B23B 31/107   (2006.01)
(52) U.S. Cl. .............................. 279/19; 279/22; 279/71
(58) Field of Classification Search ................. 279/19, 279/22, 71, 19.3, 19.4, 19.5, 19.6, 20, 30, 279/78, 81, 137, 157
See application file for complete search history.

(56) References Cited

U.S. PATENT DOCUMENTS

| | | | | |
|---|---|---|---|---|
| 2,069,527 A * | 2/1937 | Kirkland | ...................... | 81/53.2 |
| 3,947,047 A * | 3/1976 | Hultman | ...................... | 279/75 |
| 4,290,617 A * | 9/1981 | Yoshida | ...................... | 279/75 |
| 4,476,749 A * | 10/1984 | McKean | ...................... | 81/53.2 |
| 5,005,843 A * | 4/1991 | Markle et al. | ................. | 279/29 |
| 5,277,084 A * | 1/1994 | Weber et al. | ................. | 81/53.2 |
| 5,299,473 A * | 4/1994 | Weber et al. | ................. | 81/53.2 |
| 5,301,573 A * | 4/1994 | Weber et al. | ................. | 81/53.2 |
| 5,437,524 A * | 8/1995 | Huang | ......................... | 408/139 |
| 5,464,229 A * | 11/1995 | Salpaka | ........................ | 279/30 |
| 5,577,743 A * | 11/1996 | Kanaan et al. | ................. | 279/72 |
| 5,755,448 A * | 5/1998 | Kanaan et al. | ................. | 279/75 |
| 5,928,241 A * | 7/1999 | Menut et al. | .................. | 606/80 |
| 5,988,957 A | 11/1999 | Wheeler | | |
| 6,059,296 A * | 5/2000 | Baeder | ......................... | 279/20 |
| 6,123,157 A * | 9/2000 | Barnes | ......................... | 173/211 |
| 6,126,370 A | 10/2000 | Wheeler et al. | | |
| 6,321,855 B1 * | 11/2001 | Barnes | ......................... | 173/211 |

FOREIGN PATENT DOCUMENTS

| | | | |
|---|---|---|---|
| DE | 3504917 A1 * | 8/1985 | |
| WO | 9532830 | 12/1995 | |
| WO | 9635535 | 11/1996 | |

OTHER PUBLICATIONS

Japanese Patent Publication JP-4360703, Dec. 14, 1992.
Search Report.

* cited by examiner

*Primary Examiner*—Monica Carter
*Assistant Examiner*—Michael W. Talbot
(74) *Attorney, Agent, or Firm*—Abelman, Frayne & Schwab

(57) ABSTRACT

A chuck (2) for a hand-held power tool (4), which is connected with a motor-driven spindle (6) of the power tool for joint rotation therewith, includes a locking device for securing a shaft section of an exchangeable working tool and having a circular cross-section in the chuck (2) without a possibility of axial displacement and rotation relative to the chuck (2), with the locking device having a clamping element (12; 34) for securing the shaft section (8), and an element (18) for transmitting rotation to the shaft section (8) and rotationally separated from the clamping element (12; 34) by a rotary bearing (2).

4 Claims, 3 Drawing Sheets

CHUCK

BACKGROUND OF THE INVENTION

1. Field of the Invention

The present invention relates to a chuck for a hand-held power tool, in particular, for a diamond drilling tool. The chuck is connected with the spindle of the hand-held power tool for joint rotation therewith. The chuck comprises a locking device for securing a shaft section of an exchangeable working tool having a circular cross-section, without a possibility of axial displacement and rotation relative to the chuck.

2. Description of the Prior Art

A chuck, which is described above, is suitable for using working tools the shaft of which has a cylindrical form. Thereby, a hand-held power tool can be used with commercially available working tools such as, i.e., drill bits and, in particular, diamond drills. The working tools, which are used with the hand-held power tools, can be produced, because of the simple form of their shafts, with relatively low manufacturing costs.

International publication WO96/35535 discloses a quick-action chuck in which a working tool can be secured against both axial displacement and rotation relative to the chuck. The quick-action chuck has a locking element having a plurality of locking rollers which are held in respective recesses of a carrier sleeve. The carrier sleeve is arranged within an actuation sleeve that forms, in its inner surface, a plurality of ramp regions for respective locking rollers. Upon rotation of the actuation sleeve relative to the carrier sleeve, the ramp sections press the locking rollers partially out of their respective recesses and into a longitudinal bore of the carrier sleeve. The pressed-out clamping rollers clamp the shaft of the working tool which was pushed into the longitudinal bore. In order to retain the clamping rollers in the clamping position, the actuation sleeve is secured on the carrier sleeve formlockingly or frictionally. frictionally.

The advantage of the known quick-action chuck consists in that the clamping element is used for both transmission of the rotational movement and axially securing the working tool. The axial locking takes place independent of whether the chuck is rotated or remains stationary.

The drawback of the known chuck consists in a relatively complex construction of the chuck which results, in particular, from a need to insure that the actuation sleeve is reliably secured on the carrier sleeve. As a result, the chuck is susceptible to failure, on one hand, and on the other hand, can be produced only with high manufacturing costs. Moreover, because of a predetermined position of the actuation sleeve relative to the carrier sleeve in the locking position only a shaft section having a predetermined diameter can be secured in the chuck. Furthermore, a relatively large force and expenditure of time is required for securing of the actuation sleeve on the carrier sleeve.

Accordingly, an object of the present invention is to provide a quick-action chuck for receiving a shaft section having a circular cross-section and in which the foregoing drawbacks are eliminated.

Another object of the present invention is to provide a quick-action chuck that would insure a rapid insertion and withdrawal of a working tool while insuring that the working tool is reliably secured in the chuck without any possibility of axial displacement and rotation relative to the chuck.

SUMMARY OF THE INVENTION

These and other objects of the present invention, which will become apparent hereinafter, are achieved by providing a chuck with a locking device including a clamping element for securing the shaft section, and an element for transmitting rotation to the shaft section and rotationally separated from the clamping element by a rotary bearing.

With a locking device according to the present invention, even with a certain backlash, the torque is transmitted only by the rotation transmitting element and not by the clamping element. In this way, the loading of the clamping element is reduced essentially to axial forces that occur, with a stationary spindle, in the to-be-retained working tool. The reduced load permits use of a particularly easy actuable clamping element that can be cost-effectively produced and that insures a quick replacement of the working tool.

Advantageously, the rotary bearing is formed as a roller bearing that on one hand, insures a reliable rotational separation and, on the other hand, a stable axial connection between the clamping element and the rotation transmitting element.

According to a particularly advantageous embodiment of the present invention, the rotation transmitting element includes a free-running sleeve that is self-locking in the rotational direction of the spindle. Thereby, the cross-section of the circular shaft section becomes automatically clamped in the chuck upon rotation of the spindle. This feature is particular suitable for applications with high rotational speeds and small torques, which are characteristic, e.g., for diamond drilling tools. The free-running sleeve insures a very precise centering of the working tool and prevents thereby harmful unbalances. Further, with the free-running sleeve, the automatically produced frictional connection between the free-running sleeve and the shaft section is completely adequate for the transmitting the operational torque even in the presence of a small backlash. With a stationary spindle, the clamping rollers transmit only minimal holding forces, so that the working tool can be withdrawn from the chuck particularly easy.

Advantageously, the clamping element includes an elastic clamping member having a through-opening for receiving the shaft section of the working tool and having, in an unloaded condition of the clamping element, a diameter smaller than a diameter of the shaft section. Thereby, the clamping element is automatically actuated when the working tool is inserted in the chuck. This provides for a particularly easy and quick locking of the working tool in the chuck.

Advantageously, the clamping member is formed as an O-ring, which provides for a particularly cost-effective manufacture of the clamping element. In addition, with the clamping member being formed as an O-ring, it simultaneously is used as a seal that seals the interior of the chuck from the environment.

Alternatively, the clamping member can be formed as a disc spring. This insures, with a small available constructional space, a stable axial fixing of the working tool in the chuck.

The clamping element further includes, advantageously, a release member that displaces the disc spring to its release position. Thereby, a rapid removal of the working tool from the chuck with a small expenditure of forces becomes possible.

It is particularly advantageous when the release member is formed as a displaceable sleeve having an annular region surrounding the through-opening of the disc spring for applying pressure to the disc spring. With such release member, upon unlocking of the clamping element, tilting of the disc spring, together with the shaft section of the working tool, is prevented. This insures a particularly easy withdrawal of the working tool from the chuck.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompany drawings.

DETAILED DESCRIPTION OF THE PREFERRED EMBODIMENT

Figure 1:
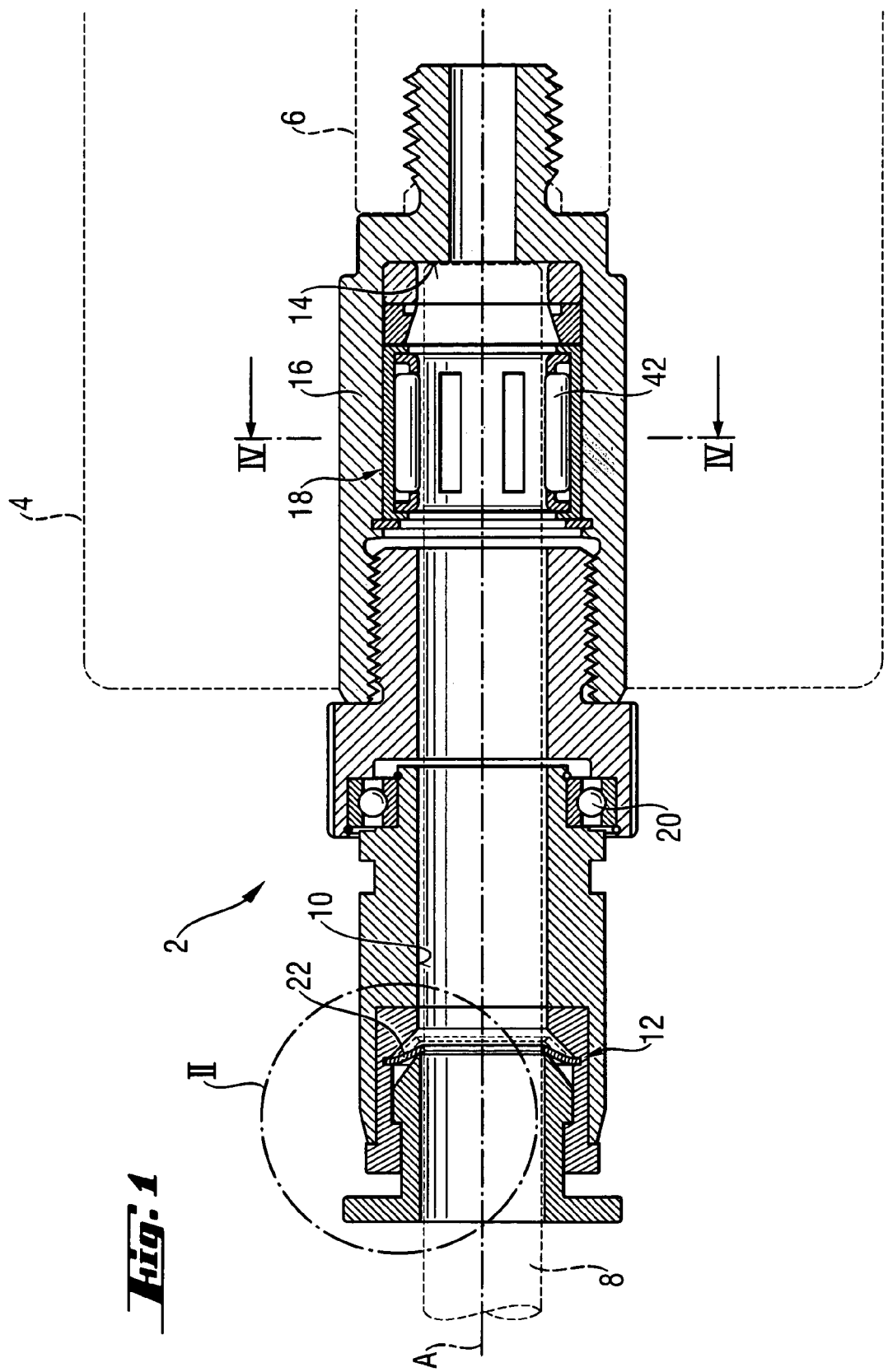
FIG. 1 a longitudinal cross-sectional view of a chuck according to the present invention.

A chuck 2 according to the present which is shown in FIG. 1, is designed to be fitted in a neck of a hand-held power tool 4, such as, e.g., a diamond drilling tool, which is shown with dash lines. The chuck 2 is connected with a motor-driven spindle 6 of the power tool, without a possibility of rotation relative thereto. The chuck 4, is, thus, set in rotation about an axis A by the spindle 6.

The chuck 2 has a longitudinal bore 10 into which, as shown with dash lines, is inserted a shaft section 8 of a replaceable tool, not shown in detail, such as, e.g., a diamond drill. The shaft section 8 has a circular cross-section over its entire length which is inserted in the bore 10.

At the end of the longitudinal bore 10 remote from the spindle 6, there is provided a clamping device 12 that fixedly secures the shaft section 8 in the chuck 2 in the axial direction of the chuck 2. At the opposite, spindle side end of the bore 10, there is provided a stop 14 for the shaft section 8 and which is formed by the housing 16 of the chuck 2. In the vicinity of the stop 14, there is provided a rotation transmitting element 18 which connects the shaft section 8 with the chuck 2 for joint rotation therewith. The clamping device 12 and the rotation transmitting element 18 form together a locking arrangement with which a to-be-used working tool can be completely secured in the chuck 2 over the shaft section 8 which has, as it has already been discussed above, a circular cross-section.

Between the clamping device 12 and the rotation transmitting element 18, there is provided a rotary bearing 20 in form of a ball bearing that rotationally decouples the clamping device 12 from the rotation transmitting element 18 so that during operation no rotational movement is transmitted by the clamping device 12 to the shaft section 8 even in case the rotation transmitting element 18 slips.

Figure 2A:
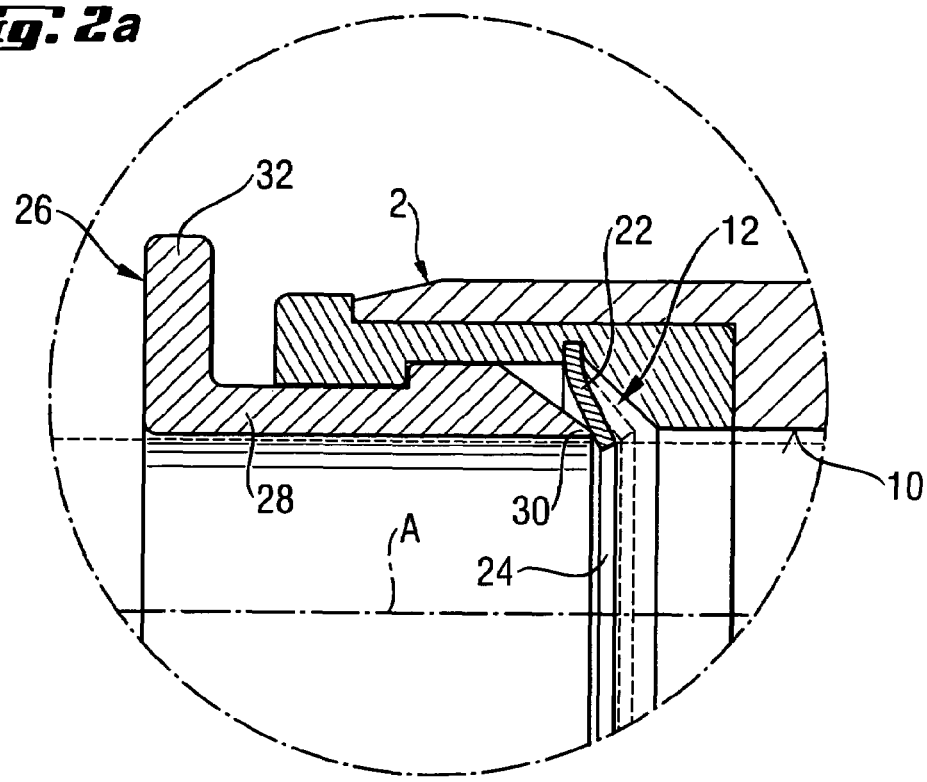
FIG. 2a a detailed cross-sectional view at an increased, in comparison with FIG. 1, scale of a clamping device of the chuck in region II of FIG. 1 in a locking position with a working tool being removed.

FIG. 2a shows, at an increased scale, the upper part of the clamping device 12. The clamping device 12 includes a clamping member in form of a disc spring 22 that forms a through-opening 24. In the unloaded condition of the disc spring 22 which is shown in FIG. 2a, the opening 24 has a diameter which is smaller than the diameter of the shaft section 8 and of the longitudinal bore 10 that is adapted to the shaft section 8 to a most possible extent. Thus, in the unloaded condition, the disc spring 22 projects into the bore 10 over its entire circumference.

When the shaft section 8, shown with dash lines, is pushed into the longitudinal bore 10, the diameter of the through-opening 24 expands to that of the shaft section 8, whereby the disc spring 22 applies pressure circumferentially to the shaft section 8, securing the shaft section 8 in the axial direction of the chuck 2.

In order to be able to pull the shaft section 8 out of the longitudinal bore 10, e.g., in order to replace the inserted working tool, there is provided a release element 26. The release element 26 consists essentially of a sleeve 28 telescopically supported for axial displacement at the working tool side end of the bore 10. The sleeve 28 projects into the longitudinal bore 10, with its end region 30 circumferentially engaging the disc spring 22. At its side remote from the end region 30, the sleeve 28 has an actuation section 32 that is accessible from outside.

Figure 2B:
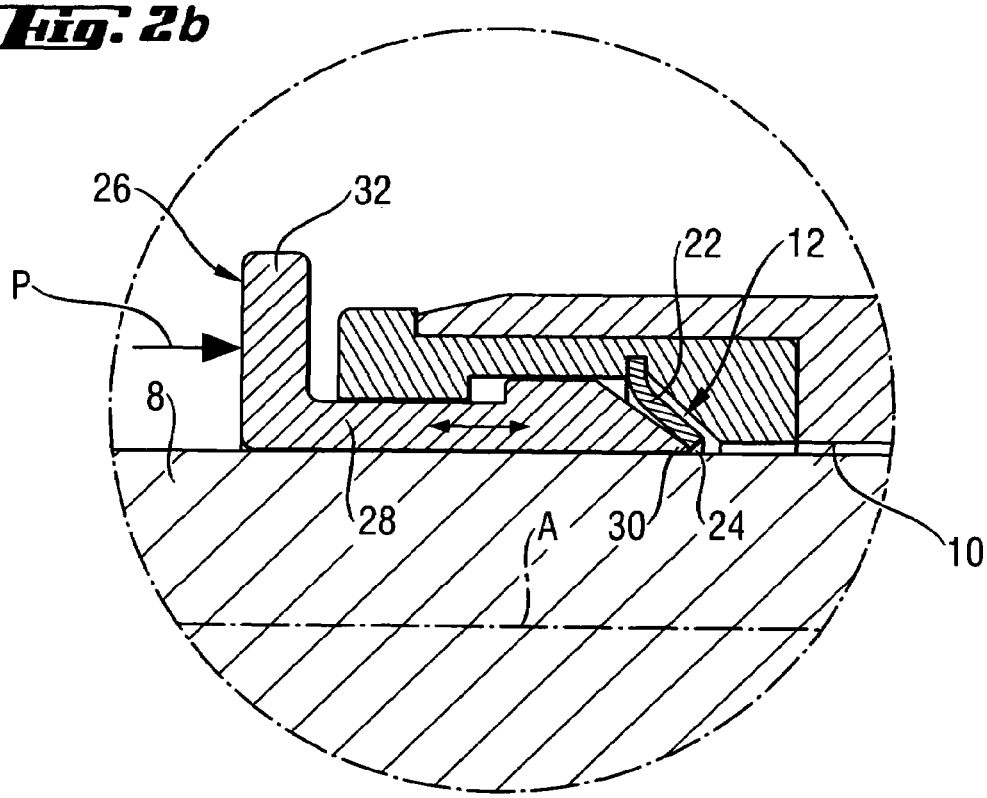
FIG. 2b a detailed cross-sectional view at an increased, in comparison with FIG. 1, scale of a claming device of the chuck in region II of FIG. 1 in a release position with a working tool being removed.

As shown in FIG. 2b, the sleeve 28, upon application of a pressure force P to the actuation section 32 in the direction of the spindle side, second end of the longitudinal bore 10, is pushed into the bore 10. The end region 30 applies pressure to the disc spring 22, insuring a further expansion of the bore 24 the diameter of which is only slightly greater than the diameter of the shaft section 8. In this release position of the spring 22, the shaft section 8 can be pulled out of the bore 10 without much resistance.

Figure 3:
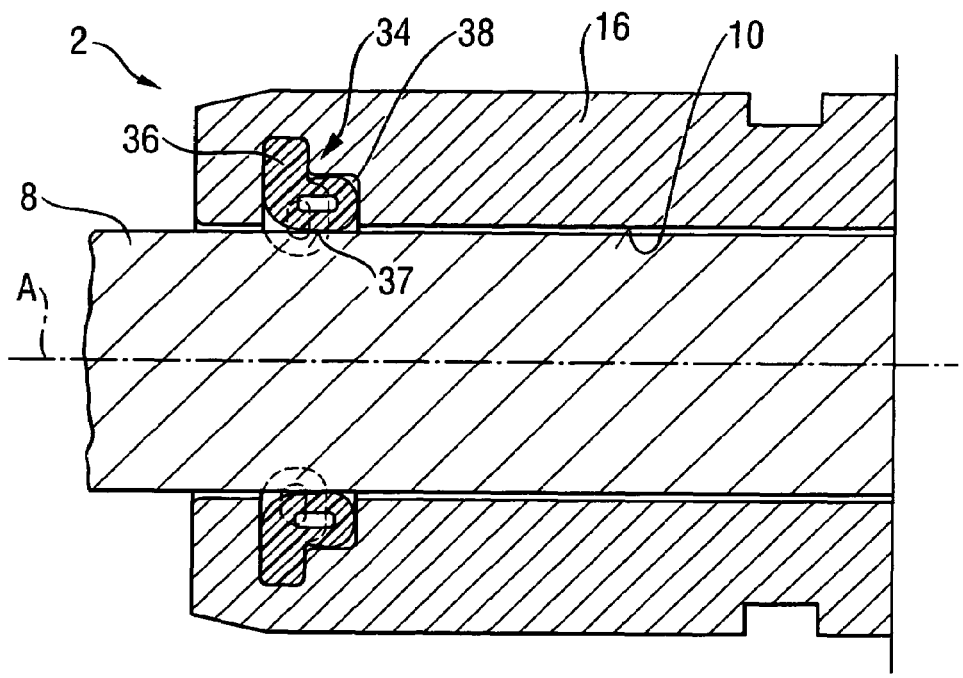
FIG. 3 a longitudinal cross-sectional view of another embodiment of a clamping device of a chuck according to the present invention.

An alternative embodiment of a clamping device, which is designated with a reference numeral 34, is shown in FIG. 3. The clamping device 34 is formed essentially of an O-ring 36 embedded in the housing 16 of the chuck 2. In an unloaded condition, the O-ring 36 projects into the longitudinal bore 10, as shown with dash lines. When the shaft section 8 is pushed into the longitudinal bore 10, the O-ring 36 is pressed into an annular recess 38, with the O-ring opening 37 expanding. As a result, recovery forces are generated in the O-ring 36, with the O-ring 36 circumferentially pressing against the shaft section 8. The recovery forces are sufficiently large to be able to retain the working tool over its shaft section 8 in the chuck 2 against the gravity force when the working tool is fitted in the neck of the power hand-held tool 4.

Figure 4:
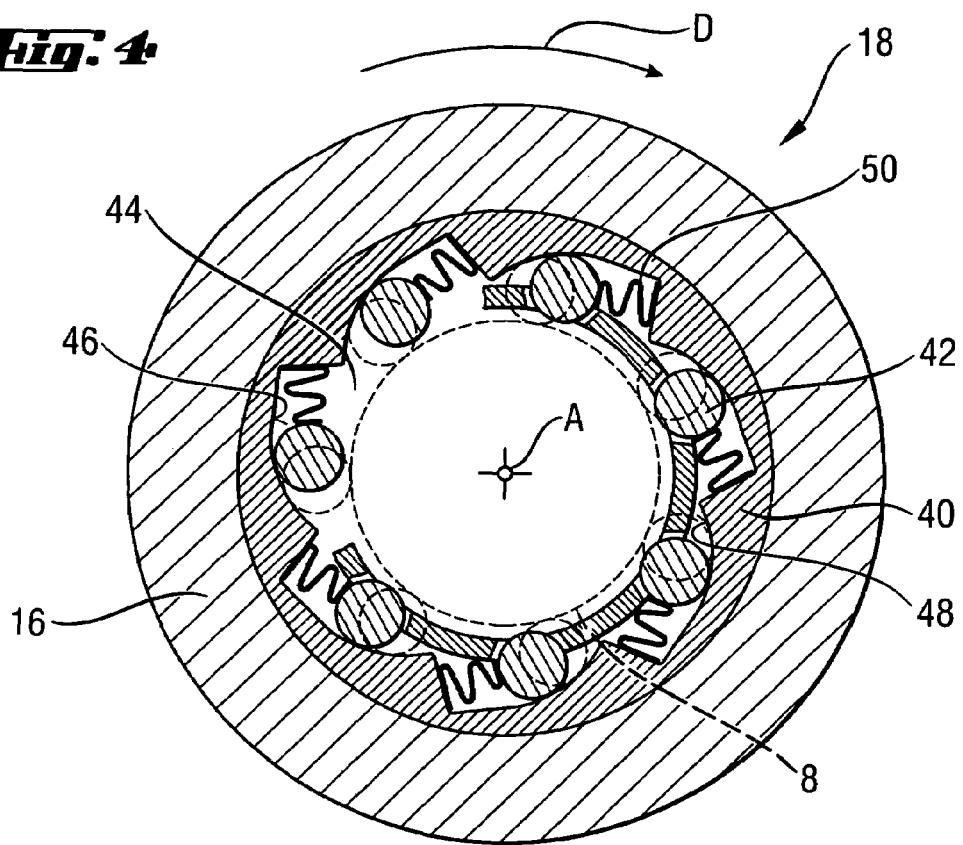
FIG. 4 a cross-sectional view along line IV-IV of rotation transmitting element of a chuck according to the present invention.

FIG. 4 shows the rotation transmitting element 18 at an increased scale. The rotation transmitting element 18 is formed essentially as a free-running sleeve 40 that blocks the chuck 2 in the rotational direction D which corresponds to the rotational direction of the spindle 6. The free-running sleeve 40 has a plurality of roll-shaped rolling members 42 which are located in an annular gap 44 between an inner side 46 of the free-running sleeve 40 and a shaft section 8 when the shaft section 8 is inserted in the chuck. Each rolling member 42 is associated with a respective ramp section 48 of the free-running sleeve 40 and which is inclined inward from the inner side 46 of the free-running sleeve 40.

Thereby, the annual gap 44 narrows toward a side of a respective rolling member 42 in a direction opposite the rotational direction D.

As soon as the spindle 6 and, thereby, the chuck 2 start to rotate in the rotational direction D, the rolling members 42 are displaced toward the respective ramp sections 48 and are displaced therealong inwardly, as shown with dash lines. As a result, the rolling members 42 become locked in the narrow annular gap 44 between the free-running sleeve 40 and the shaft section 8, providing for rotation of the shaft section 8 in the rotational direction D, together with the chuck 2.

A spring 50 is supported against each ramp section 48 and biases a respective rolling member 42 in a direction of an adjacent ramp section 48. The springs 50 insure that the rolling members 42 become clamped between the free-running sleeve 40 and the shaft section 8 as soon as possible upon rotation of the chuck 2 in the rotational direction D.

As soon as the spindle 6 stops to rotate, the holding forces applied by the rolling members 42 to the shaft section 8 become rather small, and the shaft section 8 can be pulled out of the chuck 2 without any problem.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A chuck (2) for a hand-held power tool (4) having a motor-driven spindle (6) with which the chuck (2) is connected for joint rotation therewith, the chuck (2) comprising:

locking means for securing a shaft section (8) of an exchangeable working tool having a circular cross-section without a possibility of axial displacement and rotation relative to the chuck (2), the locking means having a clamping element (12; 34) for securing the shaft section (8), and an element (18) for transmitting rotation to the shaft section (8) and separated from the clamping element (12; 34); and a rotary bearing (20) for rotationally separating the clamping element (12; 34) and the rotation transmitting element (18), wherein the clamping element (12; 34) comprises an elastic clamping member having a through-opening (24; 37) for receiving the shaft section (8) and having, in an unloaded condition of the clamping element, a diameter smaller than a diameter of the shaft section (8), wherein the clamping member is formed as a disc spring (22), and the clamping element (12) comprises a release member (26) for displacing the disc spring (22) in a release position thereof.

2. A chuck according to claim 1, wherein the rotary bearing (20) is formed as a roller bearing.

3. A chuck according to claim 1, wherein the rotation transmitting element (18) comprises a free-running sleeve (40) self-locking in a rotational direction (D) of the power tool spindle (6).

4. A chuck according to claim 1, wherein the release member (26) is formed as a displaceable sleeve (28) having an annular region (30) surrounding the though-opening (24) of the disc spring (22) for applying pressure to the disc spring (22).

* * * * *